Patented Apr. 20, 1948

2,439,828

UNITED STATES PATENT OFFICE 2,439,828

THIAZINE DIMER

Frank Swedish, Jr., Rothschild, Wis., assignor to The B. F. Goodrich Company, New York, N. Y., a corporation of New York No Drawing. Application August 7, 1946, Serial No. 688,960

7 Claims. (Cl. 260—243)

This invention relates to new compositions of matter and pertains specifically to the dimer of 2-mercapto-4,6,6-trimethylthiazine and its metal salts.

I have discovered that the dimer of 2-mercapto-4,6,6-trimethylthiazine can be prepared by treating 2-mercapto-4,6,6-trimethylthiazine or 2-mercapto-4-hydroxy-4,6,6 - trimethyldihydrothiazine (which may be regarded as the hydrate of the mercapto trimethylthiazine), with an aqueous solution of the dehydrating mineral acid of a concentration hereinafter set forth, and then heating the reaction mixture. The reaction may be represented in the following manner:

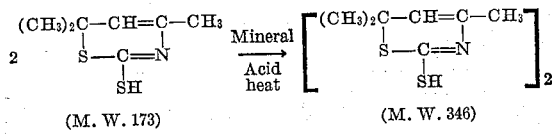

When the hydroxy dihydrothiazine is used, it is first dehydrated to the thiazine and the reaction then proceeds as indicated above.

The mechanism of the reaction and the structure of the dimer are not completely understood but it is believed that dimerization of the thiazine takes place by opening of the carbon to carbon double bond.

2-mercapto-4,6,6-trimethylthiazine and 2-mercapto-4-hydroxy-4,6,6 - trimethyldihydrothiazine can be prepared by reacting dithiocarbamic acid with mesityl oxide, preferably by adding a salt of dithiocarbamic acid to a mixture of mesityl oxide with an aqueous solution of hydrochloric acid at a temperature of about 0 to 40° C. and then heating the reaction mixture, the dihydrothiazine, which is an intermediate in the preparation of the thiazine, resulting if the product is insufficiently heated. The preparation of these compounds is more fully described in the copending application of Jacob Eden Jansen Sr. No. 557,384, filed October 5, 1944, particularly in Examples I to III thereof.

The preferred procedure of this invention is to treat 2-mercapto-4,6,6,-trimethylthiazine or 2-mercapto-4-hydroxy-4,6,6 - trimethyldihydrothiazine, with an aqueous solution of sulfuric acid containing not less than 50% sulfuric acid by weight but not more than 80% by weight and then heat the reaction mixture to a temperature not in excess of 90° C. A more detailed description of the preparation of the dimer is given in the following example in which the parts are by weight.

Example I 500 parts of 65% sulfuric acid were added to 430 parts of 2-mercapto-4,6,6-trimethylthiazine in a reaction vessel with stirring. There was an immediate temperature rise to about 50° C. and the slurry changed to a red color. The reaction mixture was then heated to about 75° C. for 30 minutes, and the slurry turned to a tan colored paste. 3,000 parts of water were added to the paste with stirring. The dimer settled out of the aqueous diluent as a finely-divided, yellow crystalline solid. The product was filtered, washed free of acid and dried at room temperature. 411 parts (96% yield) of the dried dimer, which had a melting point of 195 to 200° C., were thus obtained. When purified by recrystallization the dimer was found to possess a melting point of 206° C. and a molecular weight of 342. The thiazine originally used, however, had a melting point of 97° C. and a molecular weight of 173, thus showing that dimerization had occurred.

A chemical analysis of the dimer showed the following composition as compared to composition calculated from the theoretical formula.

|  | By Analysis | Calculated |
| --- | --- | --- |
|  | Per cent | Per cent |
| Carbon | 48.52 | 48.50 |
| Hydrogen | 6.44 | 6.40 |
| Nitrogen | 8.09 | 8.09 |
| Sulfur | 37.02 | 37.01 |
|  | 100.07 | 100.00 |

When the example was repeated using 2-mercapto-4-hydroxy - 4,6,6 - trimethyldihydrothiazine in place of 2-mercapto-4,6,6-trimethylthiazine, a good yield of the same product, melting at 206° C. was likewise obtained.

Various other modifications in the procedure of the example may also be effected while still obtaining the thiazine dimer in good yield. Thus, although the use of sulfuric acid is preferred, such other dehydrating mineral acids as hydrochloric acid and phosphoric acid may also be used. The concentration of the acid, however, is critical and must be that which is equivalent to aqueous sulfuric acid containing 50 to 80% sulfuric acid by weight, for, if the concentration is above 80% there are obtained products other than the dimer, while concentrations of less than 50% convert little or none of the thiazine to the dimer. I have found that concentration or sulfuric acid of about 60% to about 75% give the most satisfactory results.

The acid is recovered quantitatively from the aqueous diluent and appears to act as a catalyst for the dimerization of the thiazine. The amount of acid required to bring about the dimerization is not critical and can be varied, it being preferred to have sufficient aqueous acid present to produce a slurry that can be readily stirred to insure not only good contact between the acid and the thiazine but also to give good heat transfer throughout the reaction mixture. This is accomplished in general by the use of a greater quantity, say 1 to 2 times as much, of acid than of the thiazine but the use of excessive quantities of acid would only make the washing of the dimer product more difficult and expensive, and is accordingly not desirable.

The length of time of heating the acid thiazine slurry is not critical as a reaction condition, but the slurry should be heated for a time sufficient to give good conversions, which can readily be determined for any given set of conditions, and the time of heating should be considered as an economic factor in the selection of reaction equipment. The temperature to which the thiazine-acid slurry is heated is critical only in that the slurry should not be heated above 90° C., for, when heated above 90° C., the thiazine melts and forms an oily liquid which is not miscible with the water phase. In such a two-phase system the reaction conditions would not be conducive to good conversion to the dimer.

As mentioned hereinabove, this invention relates not only to the dimer of 2-mercapto-4,6,6-trimethylthiazine but also to the metal salts thereof. The alkali metal salts are soluble in water and are obtained in solution simply by adding the dimer to a heated aqueous solution containing two molecular equivalents of alkali hydroxide for each molecular equivalent of dimer. Other metal salts are generally water insoluble and are quite easily prepared by adding an aqueous solution of a water soluble salt of the metal to an aqueous solution of an alkali metal salt of the dimer whereupon a metathetical reaction occurs and the insoluble metal salt of the dimer precipitates and is recovered by filtration in substantially theoretical yields.

The following examples illustrate the preparation of metal salts of the dimer.

*Example II*

The lead salt of the dimer was prepared by dissolving 260 parts of the dimer in 500 parts of hot tap water to which 66 parts of sodium hydroxide had been added. The resulting solution was decanted to remove a trace of foreign material. To the aqueous solution of the sodium salt of the dimer, there was added with stirring 273 parts of lead nitrate dissolved in 500 parts of water. A heavy precipitate immediately formed, and the entire mass thickened to a paste. A small amount of dilute hydrochloric acid was added to the paste to make it neutral to prevent the formation of lead hydroxide. A sufficient amount of water was added to the paste to increase the volume to about three liters to form a readily processing slurry which was filtered to recover the lead salt. The lead salt when washed and dried was light yellow, had a melting point of 190° C. and was obtained in a 98% yield.

The reaction with divalent metal salts takes place in a 1:1 molecular ratio of dimer to metal. As proof of this, a molecular ratio of 1:2 of dimer to lead salt was reacted, but the yield was substantially the same as for a 1:1 ratio reaction and the product had the same properties.

*Example III*

The zinc salt of the dimer was prepared using the same amounts of reactants and diluents as above except that 150 parts of zinc chloride was used in place of the lead nitrate. The zinc salt of the dimer, which was a white finely-divided powder had a melting point of 205–207° C. and was obtained in a yield of 99.5%.

It will be understood that other water insoluble metal salts of the dimer can be formed in a similar manner by substituting salts of such metals as iron, cadmium, copper, mercury, magnesium, manganese, calcium, strontium, aluminum and others for the lead and zinc salts in the above preparations.

The thiazine dimer and its metal salts, particularly those of divalent metals, are excellent accelerators of vulcanization of rubber, natural and synthetic. Among the rubbers with which these compounds may be used are all varieties of natural rubber, such as caoutchouc, balata, gutta percha, latex, reclaimed rubber, artificial rubber isomers and such synthetic rubbers as can be vulcanized with sulfur such as polymers of butadiene, isoprene, 2,3-dimethyl butadiene, piperylene, and the like, and copolymers of these materials with acrylonitrile, styrene, methyl acrylate, methyl methacrylate, isobutylene, and other copolymerizable monomers. The dimer and its metal salts may be added to the rubber on a roll mill or in an internal mixer or by any other suitable method by which compounding ingredients are incorporated into rubber compositions. The presence of other compounding ingredients such as any of the ordinary pigments, fillers, antioxidants or other accelerators have no deleterious effect upon the accelerating properties of my new materials.

As an indication of the accelerating power of these compounds, I shall describe the effect produced in natural and synthetic rubber by the dimer itself as well as its zinc and lead salts. The following rubber compositions, in which the parts are by weight were prepared.

| Natural Rubber | Composition | Synthetic Rubber | Composition |
|---|---|---|---|
| | Parts | | Parts |
| Natural Rubber | 100 | GR-S (Copolymer of Butadiene-1,3 and styrene) | 100 |
| Carbon Black | 50 | | |
| Stearic Acid | 3.5 | | |
| Pine Tar | 3.0 | Carbon Black | 50 |
| Antioxidant | 1.0 | Zinc Oxide | 2.5 |
| Zinc Oxide | 5.0 | Antioxidant | 1.0 |
| Sulfur | 3.0 | Softener | 10.0 |
| 2-Mercaptobenzothiazole, Example C | 1.0 | Sulfur | 2.25 |
| Lead Salt of Dimer, Example D | 1.0 | Benzothiazyl-2 disulfide, Example A | 3.0 |
| Zinc Salt of Dimer, Example E | 1.0 | Dimer, Example B | 3.0 |

After vulcanizing portions of the above compositions at 280° F. for various lengths of time, the resulting vulcanizates had the physical properties as set forth in the following table, in which T is the ultimate tensile strength in pounds per square inch and E is the ultimate elongation in percent.

to aqueous sulfuric acid containing from about 50 to about 80% sulfuric acid by weight.

Table I

| Time of Vulcanization, minutes | Synthetic Rubber: GR-S | | | | Natural Rubber | | | | | |
| --- | --- | --- | --- | --- | --- | --- | --- | --- | --- | --- |
| | Ex. A | | Ex. B | | Ex. C | | Ex. D | | Ex. E | |
| | T | E | T | E | T | E | T | E | T | E |
| 15 | | | | | 2,250 | 670 | 3,825 | 715 | 3,200 | 715 |
| 30 | 850 | 910 | 1,625 | 790 | 3,700 | 685 | 4,175 | 670 | 4,000 | 665 |
| 45 | 1,225 | 810 | 2,100 | 700 | 4,150 | 630 | 4,175 | 645 | 4,200 | 655 |
| 75 | 2,400 | 795 | 2,575 | 670 | 4,200 | 615 | 4,275 | 625 | 4,025 | 640 |

The above data indicates that the dimer and its salts are more efficient accelerators than such commonly used accelerators of vulcanization as 2-mercaptobenzothiazole and benzothiazyl-2 disulfide.

While I have herein described specific methods of preparing the compounds of my invention, I do not desire nor intend to limit myself solely thereto, for, as hitherto stated, the precise proportions of the materials utilized may be varied and other materials having equivalent chemical properties may be employed, if desired, without departing from the spirit and scope of the invention as defined in the appended claims.

I claim:

1. The method of preparing the dimer of 2-mercapto-4,6,6-trimethylthiazine which comprises heating a thiazine selected from the class consisting of 2-mercapto-4,6,6-trimethylthiazine and 2-mercapto-4-hydroxy-4,6,6-trimethyldihydrothiazine in the presence of an aqueous solution of a dehydrating mineral acid at a temperature not in excess of 90° C., the concentration of the mineral acid being that which is equivalent to aqueous sulfuric acid containing from about 50 to about 80% sulfuric acid by weight.

2. The method of preparing the dimer of 2-mercapto-4,6,6-trimethylthiazine which comprises heating said thiazine in the presence of an aqueous sulfuric acid solution of a concentration of about 50% to about 80% by weight at a temperature not in excess of 90° C.

3. The method of preparing the dimer of 2-mercapto-4,6,6-trimethylthiazine which comprises heating said thiazine in the presence of an aqueous solution of sulfuric acid of a concentration of about 70% at a temperature of 70 to 80° C.

4. A compound selected from the group consisting of the dimer of 2-mercapto-4,6,6-trimethylthiazine and the metal salts thereof.

5. The dimer of 2-mercapto-4,6,6-trimethylthiazine.

6. The lead salt of the dimer of 2-mercapto-4,6,6-trimethylthiazine.

7. The zinc salt of the dimer of 2-mercapto-4,6,6-trimethylthiazine.

FRANK SWEDISH, Jr.